(12) United States Patent
Bellegarda

(10) Patent No.: US 7,353,164 B1
(45) Date of Patent: Apr. 1, 2008

(54) REPRESENTATION OF ORTHOGRAPHY IN A CONTINUOUS VECTOR SPACE

(75) Inventor: Jerome R. Bellegarda, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 926 days.

(21) Appl. No.: 10/242,849

(22) Filed: Sep. 13, 2002

(51) Int. Cl.
G06F 17/20 (2006.01)

(52) U.S. Cl. ............................................. 704/1; 704/10

(58) Field of Classification Search ............... 704/1–10
See application file for complete search history.

(56) References Cited

U.S. PATENT DOCUMENTS

| | | | |
|---|---|---|---|
| 5,040,218 A | 8/1991 | Vitale et al. | |
| 5,268,990 A | 12/1993 | Cohen et al. | |
| 5,301,109 A * | 4/1994 | Landauer et al. ............... | 704/9 |
| 5,333,275 A | 7/1994 | Wheatley et al. | |
| 5,581,655 A | 12/1996 | Cohen et al. | |
| 5,799,276 A | 8/1998 | Komissarchik et al. | |
| 5,828,999 A * | 10/1998 | Bellegarda et al. .......... | 704/240 |
| 6,016,471 A | 1/2000 | Kuhn et al. | |
| 6,029,132 A | 2/2000 | Kuhn et al. | |
| 6,108,627 A | 8/2000 | Sabourin | |
| 6,654,740 B2 * | 11/2003 | Tokuda et al. .................. | 707/5 |
| 6,684,187 B1 | 1/2004 | Conkie | |
| 6,778,952 B2 * | 8/2004 | Bellegarda ...................... | 704/9 |
| 6,778,962 B1 | 8/2004 | Kasai et al. | |
| 6,810,379 B1 | 10/2004 | Vermeulen et al. | |
| 6,847,966 B1 * | 1/2005 | Sommer et al. ................ | 707/5 |
| 6,879,957 B1 | 4/2005 | Pechter et al. | |
| 6,912,499 B1 * | 6/2005 | Sabourin et al. ............. | 704/243 |
| 2002/0046025 A1 * | 4/2002 | Hain ........................... | 704/243 |
| 2002/0077817 A1 * | 6/2002 | Atal ............................ | 704/254 |
| 2005/0196733 A1 * | 9/2005 | Budra et al. ................. | 434/178 |

OTHER PUBLICATIONS

Gotoh, et al. "Document space models using latent semantic analysis," Proc. 5th EuroSpeech, Rhodes, Greece, pp. 1443-1448, Sep. 1997.*

Bellegarda et al. "A novel word clustering algoithm based on latent semantic analysis," IEEE ICASSP-96, Atlanta, GA, May 7-10, 1996, vol. 1, pp. 172-175.*

Bellegarda et al. "Large vocabulary speech recognition with multispan statistical language models," IEEE Transactions on Speech and Audio Processing, vol. 8, Issue 1, Jan. 2000, pp. 76-84.*

Schutze, H. "Dimensions of meaning," Proceedings Supercomputing '92, Nov. 16-20, 1992, pp. 787-796.*

(Continued)

*Primary Examiner*—Tālivaldis Ivars Šmits
*Assistant Examiner*—Eunice Ng
(74) *Attorney, Agent, or Firm*—Blakely, Sokoloff, Taylor & Zafman LLP

(57) ABSTRACT

An orthographic anchor for each word in a dictionary is created in an orthographic space by mapping the words and a set of letter patterns characteristic of the words into the orthographic space. In one aspect the orthographic anchors are row or column vectors resulting from a decomposition of a matrix of feature vectors created by the mapping. In another aspect, a pronunciation for an input word is modeled based on a set of candidate phoneme strings that have pronunciations close to the input word in the orthographic space.

36 Claims, 8 Drawing Sheets

OTHER PUBLICATIONS

Yoon, K., C. Brew, and M. Beckman, "Letter-to-Sound Rules for Korean," IEEE Workshop on Speech Synthesis, Sep. 2002.*

Bellegarda, Jerome R., "Exploiting Latent Semantic Information in Statistical Language Modeling," Proceedings of the IEEE, Aug. 2000, pp. 1-18.

Vingron, Martin, "Near-Optimal Sequence Alignment," *Curr. Op. Struct. Biology*, vol. 6, No. 3, Jun. 1996, 20 pp.

Stefan Werner and Eric Keller, "Prosodic Aspects of Speech", 1994, Fundamentals of Speech Synthesis and Speech Recognition: Basic Concepts, State of the Art, and Future Challenges, pp. 23-40, Chichester: John Wiley.

* cited by examiner

REPRESENTATION OF ORTHOGRAPHY IN A CONTINUOUS VECTOR SPACE

The present application is related to U.S. patent application Ser. No. 10/243,017, filed concurrently with and assigned to the same assignee as the present application.

FIELD OF THE INVENTION

This invention relates generally to human-language analysis, and more particularly to word orthography.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2002, Apple Computer, Inc., All Rights Reserved.

BACKGROUND OF THE INVENTION

Pronunciation modeling is the process of assigning to each word in a given vocabulary a suitable sequence of phonemes (or phones). Good pronunciation modeling is critical to all speech-to-text and text-to-speech applications. In automatic speech recognition (ASR), the search module relies on phoneme sequences stored in the underlying (phonetic) dictionary to select appropriate acoustic models against which to score the input utterance. Similarly, in text-to-speech (TTS) synthesis, phonemic expansion is required for the selection of the proper TTS units from which to generate the desired waveform.

Given an input vocabulary, there are two complementary ways to construct a set of pronunciations. The most obvious method is to have one or several trained linguists manually create each entry. This is typically a time-consuming task, often prone to inconsistencies, and inherently dependent on the language considered. Yet, over the past decade, phonetic dictionaries have been in increasingly high demand as many spoken language applications reached large-scale deployment worldwide. As a result, medium (10,000) to large (100,000) dictionaries, of varying quality, are now available for most major languages.

The second method is to automatically derive pronunciations from the word orthography, e.g., the sequence of letters used to convey the word. This is necessary for the real-time processing of out-of-vocabulary words, for which no entry exists in the underlying dictionary. In fact, the dynamic nature of language makes it an instrumental part of any system. Automatic pronunciation modeling relies on a set of so-called letter-to-sound rules, whose role is to capture language regularity and properly encapsulate it within a small number of general principles. Letter-to-sound rules come in two basic flavors. They can be (hand-)written by trained linguists, as in the case of morphological decomposition for example; this approach, however, tends to suffer from the same drawbacks as above. Or they can be primarily data-driven, whereby a statistical algorithm leverages an existing dictionary to model the salient relationships between orthography and pronunciation.

In the latter case, the state-of-the-art is to train a decision tree to classify each letter sequence into the appropriate phoneme sequence. During training, the decision tree is presented with sequence pairs, aligned with the help of (language-dependent) letter mappings. During classification, the tree is traversed on the basis of questions asked about the context of each letter, until a leaf corresponding to a particular phoneme (or phoneme string) is reached. The final pronunciation is simply the concatenation of the results obtained at each leaf. Although data-driven, this procedure is not really unsupervised, since the letter mappings rely on expert human knowledge of the language considered.

"Letter-to-sound" rules work reasonably well for words that are fairly close to exemplars seen in training, but they often break down otherwise. The primary reason why current "letter-to-sound" rule implementations generalize poorly is that they attempt to capture language regularity and encapsulate it within a small number of general principles. This can be viewed as a "top-down" approach. The immediate consequence is that all rare phenomena are presumed "irregular" and, accordingly, ignored. This is a major drawback in a situation where most occurrences are infrequent, as in name pronunciation.

Perhaps even more importantly, by construction decision trees only ask contextual questions associated with phenomena that are sufficiently well represented in the training data. Contexts rarely seen in the underlying dictionary tend to be overlooked, regardless of their degree of similarity or relevance. For out-of-vocabulary words that largely conform to the general patterns of the language, as observed in the training words, this is relatively inconsequential. But many other words, such as names (especially those of foreign origin), may comprise a number of patterns rarely seen in the dictionary, for which this limitation may be more deleterious. To illustrate, consider the name of Indian origin "Krishnamoorthy," whose correct pronunciation is given by:

$$k\ r\ IH\ S\ n\ AX\ m\ 1UH\ r\ T\ IY \quad (1)$$

using a standard phonetic notation known as AppleBet from Apple Computer, Inc., the assignee of the present invention. In contrast, the pronunciation produced by a typical letter-to-sound rule decision tree trained on 56,000 names of predominantly Western European origin and which produces average results, is given by:

$$k\ r\ IH\ S\ n\ AE\ m\ 1UW\ UX\ r\ D\ IY \quad (2)$$

In particular three errors stand out in (2): the schwa "AX" in sixth position is replaced by the full vowel "AE," the penultimate unvoiced "T" is replaced by the voiced version "D," and the stressed vowel "1UH" is replaced by the improper compound "1UW UX." These errors can all be traced to the poor generalization properties of the decision tree framework. Specifically, the ending "UX r D IY" results from the influence of a number of names in the training dictionary ending in "orthy," such as "Foxworthy." The vowel compound comes from the inability of this pattern to account for "oo," hence the awkward attempt to have it both ways by concatenating the two vowels. Finally, the full vowel "AE," commonly seen in names like "McNamara," points to an obvious failure to connect "Krishnamoorthy" with the more semantically related "Krishna." This example underscores the importance of exploiting all relevant contexts, regardless of how sparsely seen they may have been in the training data, to increase the ability of a pronunciation model to generalize.

SUMMARY OF THE INVENTION

An orthographic anchor for each word in a dictionary is created in an orthographic space by mapping the words and a set of letter patterns characteristic of the words into the orthographic space. In one aspect the orthographic anchors are row or column vectors resulting from a decomposition of a matrix of feature vectors created by the mapping. In another aspect, a pronunciation for an input word is modeled based on a set of candidate phoneme strings that have pronunciations close to the input word in the orthographic space. Thus, the orthographic space captures global phoneme patterns in the dictionary and can be used for human-language applications, such as pronunciation modeling, instead of relying on the sequence of the letters in the words as in the letter-to-sound rule decision trees.

The present invention is described in conjunction with systems, clients, servers, methods, and machine-readable media of varying scope. In addition to the aspects of the present invention described in this summary, further aspects of the invention will become apparent by reference to the drawings and by reading the detailed description that follows.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

A system level overview of the operation of an embodiment of the invention is described by reference to FIG. 1. A pronunciation modeling system 100 utilizes "orthographic neighborhoods" to generate a pronunciation of an out-of-vocabulary word through a bottom-up approach. For a given out-of-vocabulary word, its orthographic neighborhood is defined as the set of in-vocabulary words that are sufficiently "close" to the out-of-vocabulary word as measured by a suitable metric. In the embodiments described herein, the metric is adopted from latent semantic analysis (LSA) but any algorithm that provides a global analysis of the orthography of words is applicable.

Figure 1:
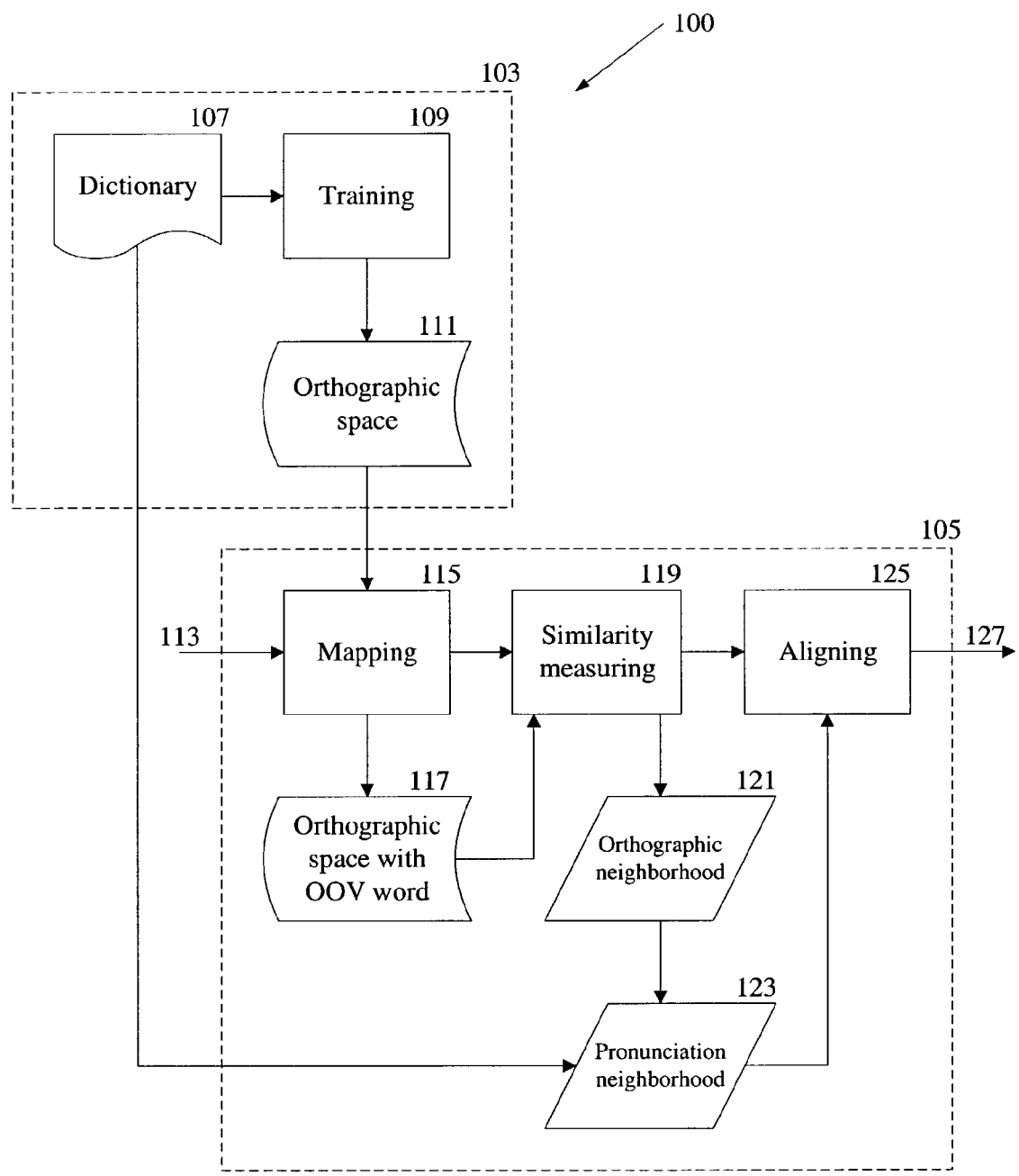
FIG. 1 is a diagram illustrating a system-level overview of an embodiment of the invention.

In the embodiment illustrated in FIG. 1, the pronunciation modeling system 100 comprises two components: a training component 103 and a pronunciation component 105. When the pronunciation modeling system 100 is being trained, a training module 109 uses LSA to determine what letter strings are most characteristic of words, and to map all training words in a dictionary 107 onto all characteristic letter strings. The resulting vector space 111 contains a plurality of orthographic anchors, one for each "in-vocabulary" word, as determined automatically from the underlying dictionary 107. The orthographic anchors may be viewed as global letter patterns without letter sequence information, e.g., the sequence "cat" and the sequence "tac" will map to the same global pattern. The vector space 111 is referred to herein as "orthographic" instead of "semantic," as is commonly used with LSA, because the vector space represents orthographic information for the in-vocabulary words. It will be appreciated that the dictionary 107 contains both the in-vocabulary words and their associated phonetic expansions in the form of phoneme strings.

During operation of the pronunciation modeling system 100, an out-of-vocabulary (OOV) word 113 is mapped 115 into the orthographic vector space 111 using LSA. The representation of the out-of-vocabulary word 113 in the orthographic vector space 117 is compared to each orthographic anchor, and the corresponding "closeness" evaluated by a similarity measuring module 119. Assuming the closeness is high enough, the associated in-vocabulary word is added to the orthographic neighborhood 121 of the out-of-vocabulary word.

Once the orthographic neighborhood 121 is populated, a corresponding set of phoneme strings from the dictionary 107 is assembled, illustrated as pronunciation neighborhood 123. The phoneme strings for the in-vocabulary words in the pronunciation neighborhood 123 have the property to contain at least one sub-string which is "locally close" to the pronunciation sought. Thus, the pronunciation can be assembled from the phoneme sub-strings in the pronunciation neighborhood. The more frequently a particular sub-string appears in a particular position within the out-of-vocabulary word, the more likely it is to belong to the correct phonetic expansion ("maximum likelihood estimate"). Because sequence information is not preserved in the orthographic neighborhood 121, the aligning module 125 aligns the phoneme strings along their common sub-strings. The sub-string with the maximum likelihood estimate at each position is assembled into the pronunciation 127 of the out-of-vocabulary word 113.

Thus, the use of orthographic neighborhoods in the pronunciation modeling system 100 takes advantage of orthographic information of the in-vocabulary words without requiring explicit language-dependent letter mappings. The pronunciation modeling system recognizes global phoneme patterns across the in-vocabulary and out-of-vocabulary words, instead of relying on the sequence of the letters in the words. The alignment of phoneme strings that produces the pronunciation is between phoneme strings instead of between a phoneme string and a letter string. Furthermore, the pronunciation modeling system 100 is data-driven and requires little or no human supervision. While the invention is not limited to any particular arrangement of components, for sake of clarity a simplified pronunciation modeling system having separate training and pronunciation components has been described.

Figure 2A:
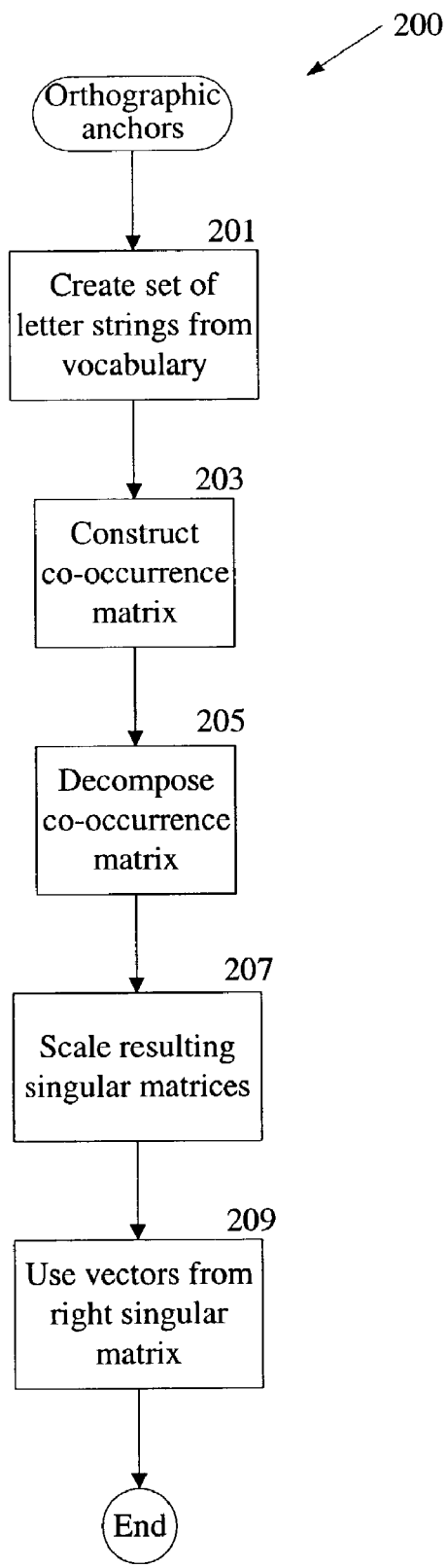
FIGS. 2A–E are flowcharts of method to be performed by a machine according to the embodiment of the invention of FIG. 1.
Figures 2B, 2C:
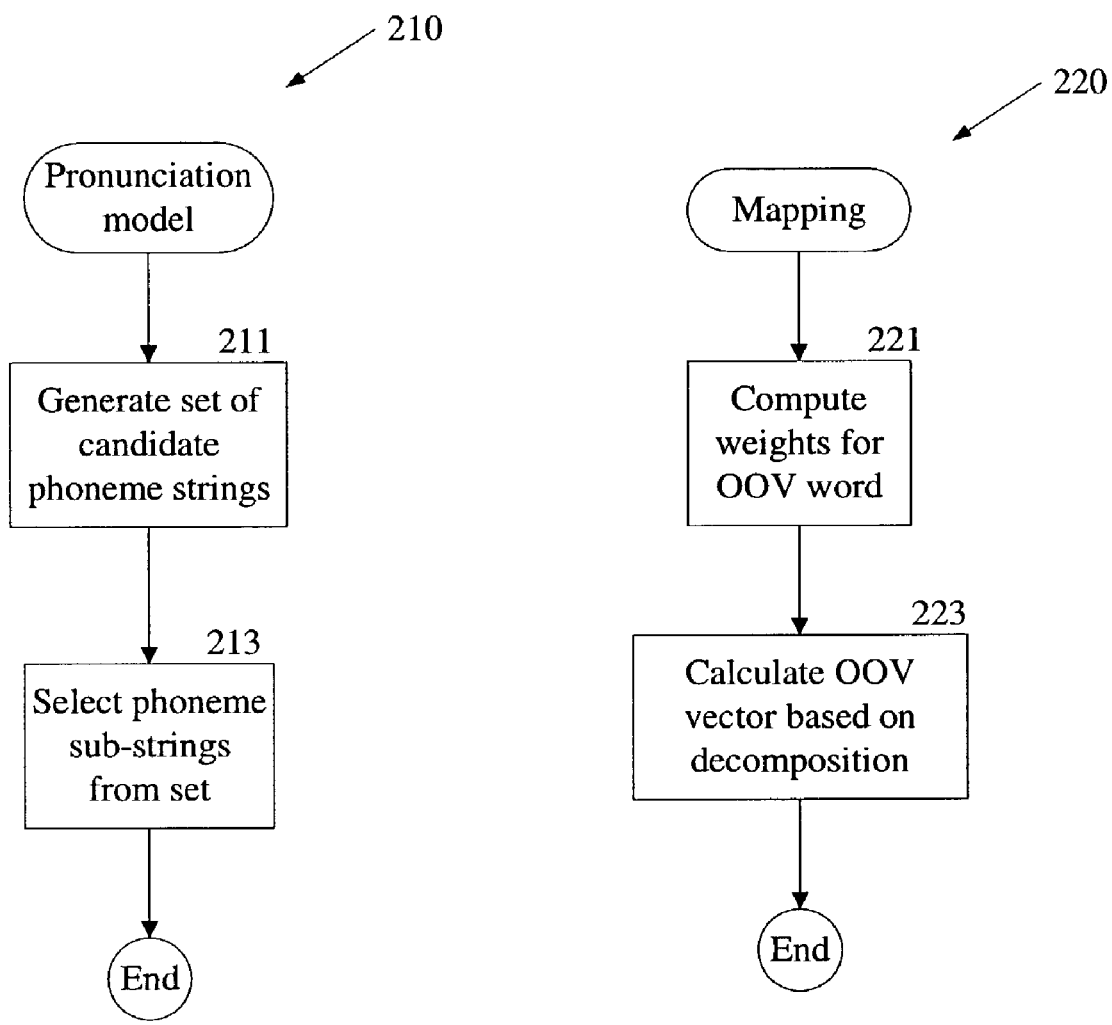
Figures 2D, 2E:
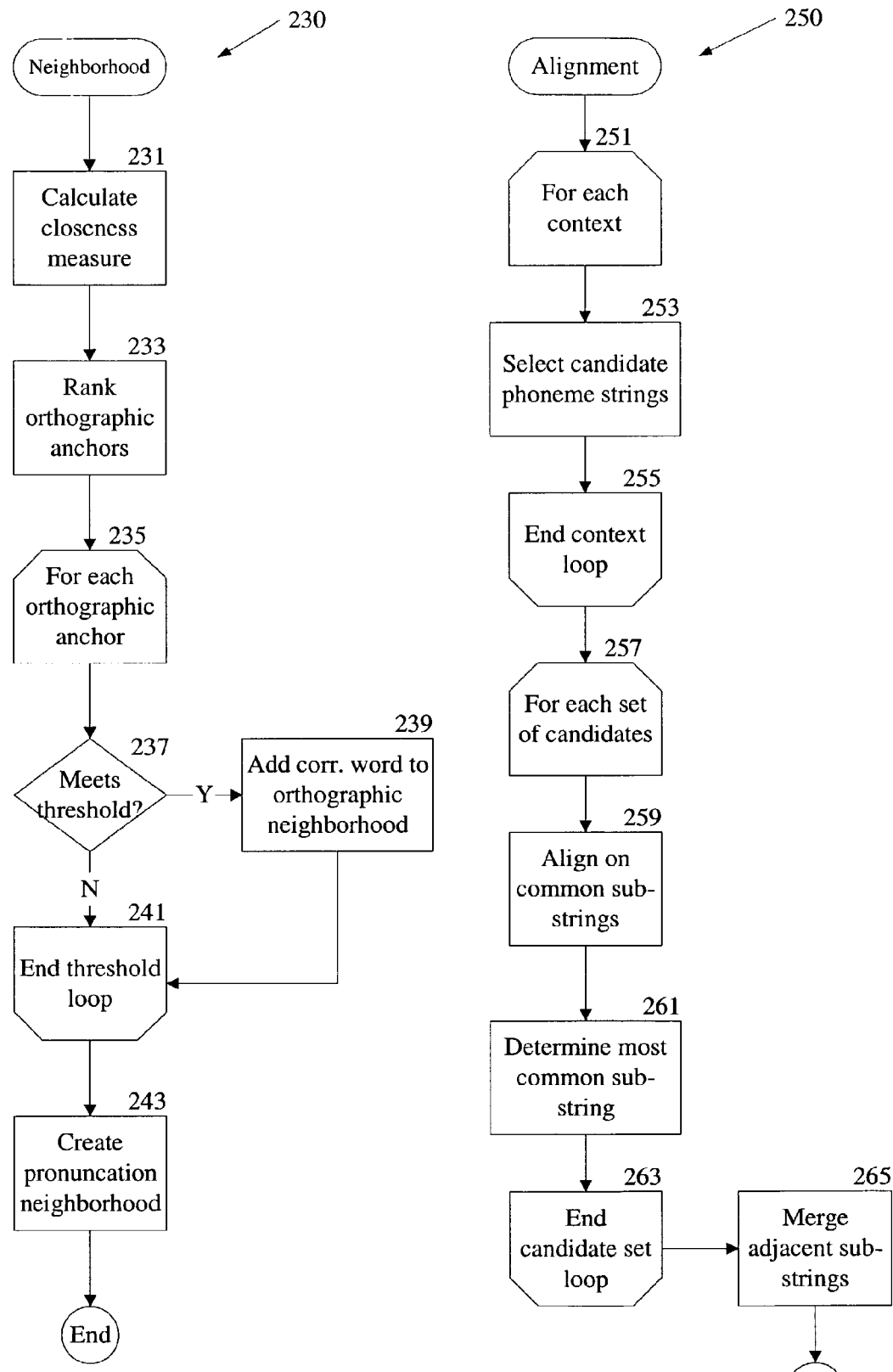

Methods to be performed by the embodiment of the pronunciation modeling system 100 illustrated in FIG. 1 are described with reference to flowcharts shown in FIGS. 2A–E. FIG. 2A illustrates the acts to be performed by a machine, such as a computer, in executing an embodiment of an orthographic space method 200 to create the orthographic anchors for the in-vocabulary words in an orthographic vector space. FIG. 2B illustrates the acts to be performed in executing an embodiment of a pronunciation model 210 to create a pronunciation for an out-of-vocabulary word, with FIGS. 2C–E illustrating the processing of FIG. 2B in more detail.

Referring first to FIG. 2A, the method 200 that creates the orthographic anchors in the orthographic vector space is described. Assuming a dictionary containing a vocabulary comprising the M most frequent words in the language, the method 200 creates a set of all strings of n letters that can be produced from this vocabulary (including markers for word beginning and ending) at block 201, with N being the number of strings in the set. Typically, M varies between 10,000 and 100,000; in one embodiment in which n=3, N is on the order of 10,000.

Figure 3A:
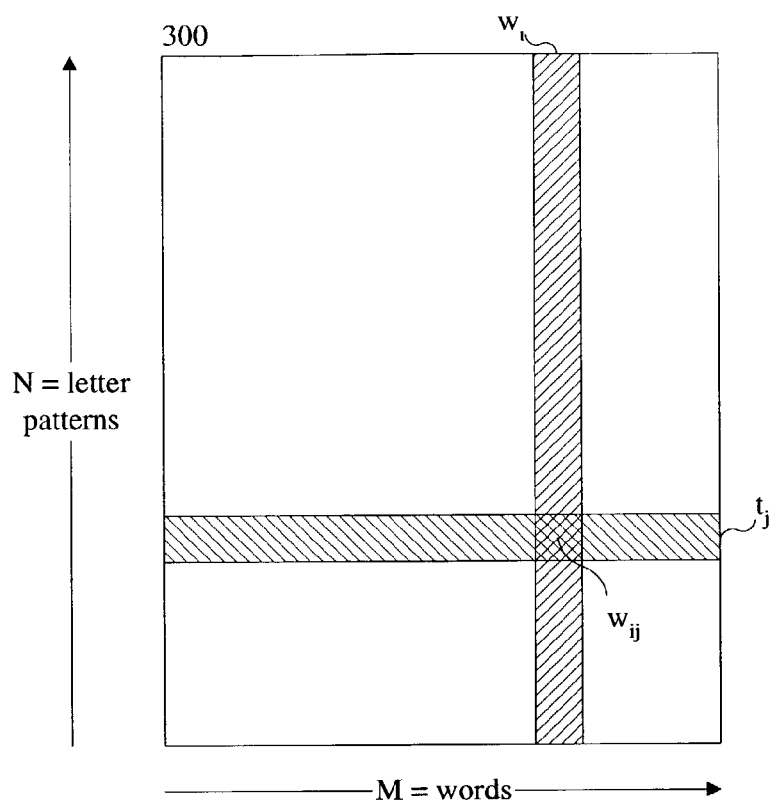
FIGS. 3A–D are diagrams of matrices produced and used by the methods of FIGS. 2A–E.

At block 203, the method 200 constructs a co-occurrence matrix N×M matrix W 300 of feature vectors as shown in FIG. 3A, in which the entries $w_{ij}$ suitably reflect the extent to which each n-letter string $t_j$ in the set appeared in each word $w_j$ in the vocabulary. Each instance of a letter string in a word is weighted because two n-letter strings appearing with the same count in a particular word do not necessarily convey the same amount of information. In one embodiment, $w_{ij}$ is defined as $$w_{i,j} = (1 - \varepsilon_i) \frac{c_{i,j}}{n_j} \qquad (3)$$

where $c_{i,j}$ is the number of times $t_i$ occurs in word $w_j$, $n_j$ is the total number of n-letter strings present in this word, and $\varepsilon_i$ is the normalized entropy of $t_i$ in the vocabulary. The global weighting $1-\varepsilon_i$ is subordinated to the distribution of the n-letter strings in the entire vocabulary. It will be appreciated that the invention is not limited to this particular global weighting and other weighting algorithms may be used, such as a logarithm transformation, or any monotonously increasing function. Additionally, embodiments that omit the weighting are contemplated as within the scope of the invention.

Figure 3B:
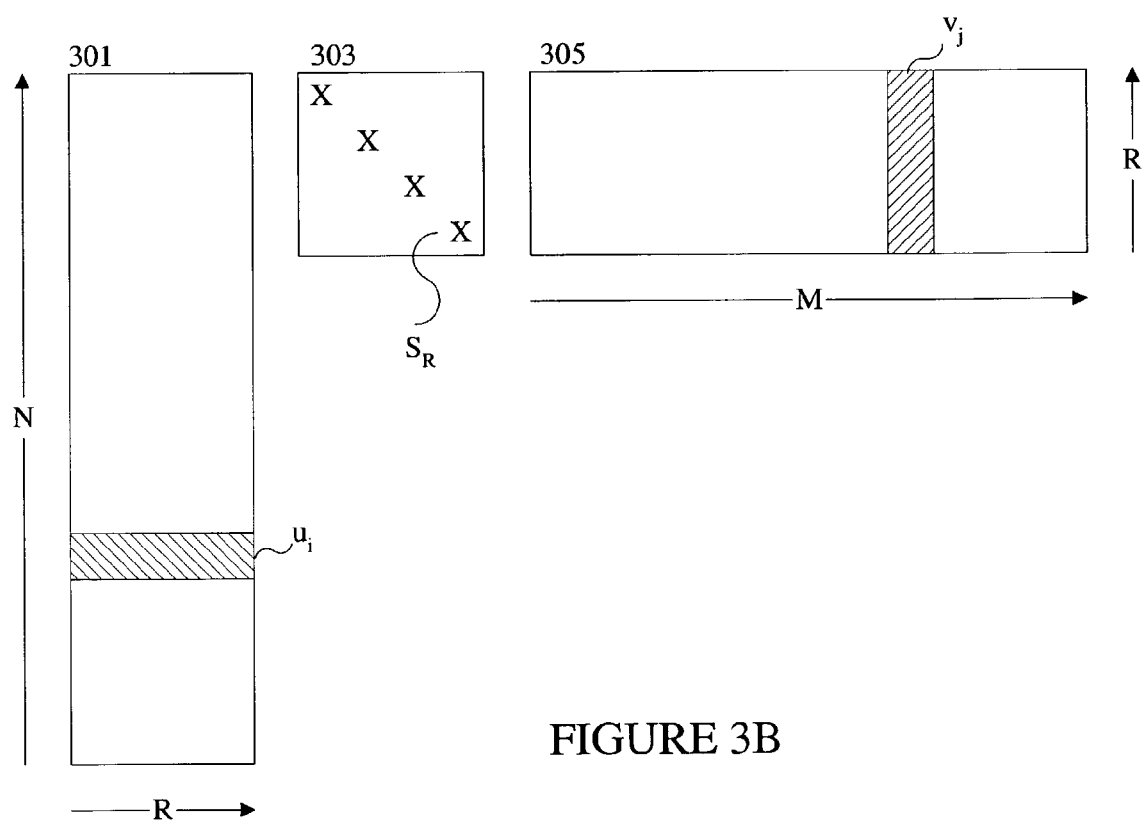

At block 205 the method 200 decomposes the co-occurrence matrix W 300 into left and right singular matrices, illustrated in FIG. 3B, using singular value decomposition (SVD)

$$W = USV^T \qquad (4)$$

where U is the (N×R) left singular matrix 301 with row vectors $u_i$ (1≤i≤N), S is the (R×R) diagonal matrix 303 of singular values $s_1 \geq s_2 \geq \ldots \geq s_R > 0$, $V^{[[T]]}$ is the (M×R) right singular matrix 305 with column vectors $v_j$ (1≤j≤M), R<<M, N is the order of the decomposition, and $^T$ denotes matrix transposition. The dimension R is bounded from above by the rank of the co-occurrence matrix W 300, and from below by the amount of distortion tolerable in the decomposition. In one embodiment, R is in the range of 50 to 100.

After appropriate scaling of the singular matrices 301, 305 by the singular values of the diagonal matrix 303 at block 207, the rank-R decomposition defines a mapping between (i) the set of n-letter strings and the R-dimensional vectors $\bar{u}_i = u_i S$ (1≤i≤N), and (ii) the set of words in the vocabulary and the R-dimensional vectors $\bar{v}_j = v_j S$ (1≤j≤M). Thus, the R-dimensional orthographic vector space spanned by the vectors $\bar{u}_i$ and $\bar{v}_j$ minimally describes the underlying vocabulary and the set of n-letter strings. The R-dimensional vectors $\bar{v}_j$ are used as the orthographic anchors for the in-vocabulary words (block 209). It will be appreciated that if the co-occurrence matrix W 300 were transposed, i.e., the matrix would be M×N, the R-dimensional vectors $\bar{u}_i$ would be used as the orthographic anchors.

Turning now to FIG. 2B, the pronunciation model method 210 uses the orthographic vector space 111 to generate a set of candidate phoneme strings having pronunciations close to the out-of-vocabulary word (block 211). The pronunciation for the out-of-vocabulary word is assembled from selected phoneme sub-strings in the set (block 213). In one embodiment, the processing represented by block 211 is illustrated in FIGS. 2C–D and in FIG. 2E at blocks 251 until 255, and the processing represented by block 213 is illustrated in FIG. 2E at blocks 257 until 265, but the invention is not limited by the particular arrangement of processing blocks shown therein. Furthermore, the processing represented in FIGS. 2C–D is described in conjunction with data structures illustrated in FIGS. 3C–D but the invention is not limited to any particular data structure.

Figure 3C:
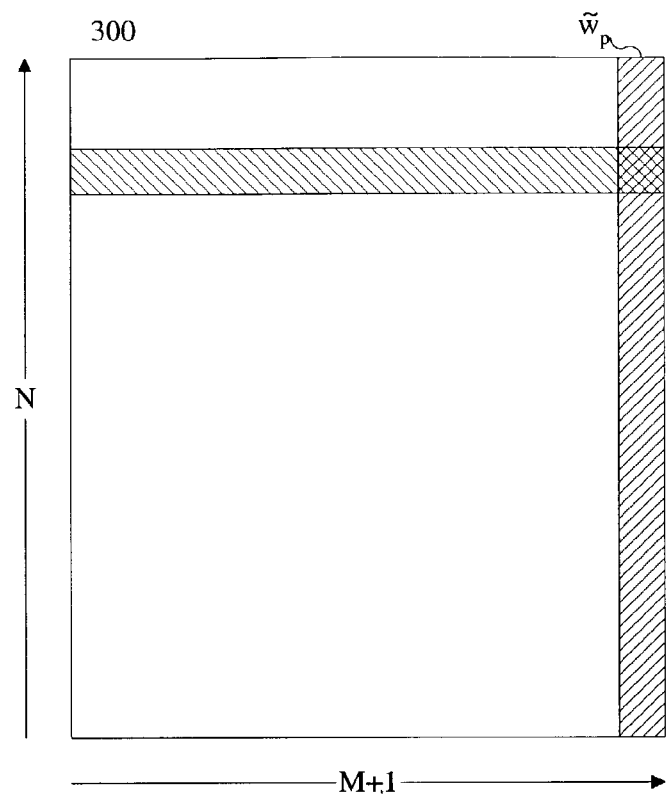
Figure 3D:
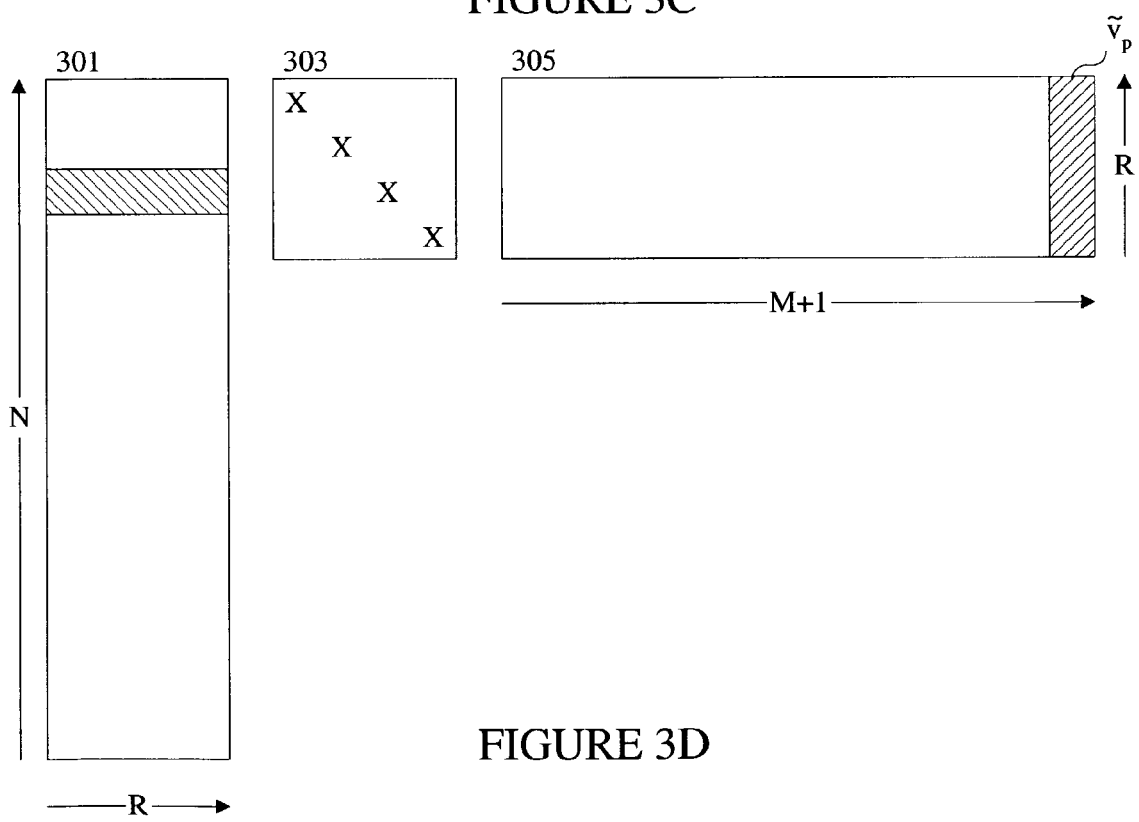

One embodiment of a mapping method 220 that creates the representation of a given out-of-vocabulary word in the orthographic vector space 111 is illustrated in FIG. 2C. Assuming an out-of-vocabulary word $\tilde{w}_p$ where p>M, weighted counts for the out-of-vocabulary word are computed as in block 201 in FIG. 2A with j=p (block 221). The resulting feature vector, a column vector of dimension N, can be thought of as an additional column of the matrix W 300 as illustrated in FIG. 3C. Assuming the matrices U 301 and S 303 do not change, the SVD expansion (4) implies $$\tilde{w}_p = US\tilde{v}_p^T \qquad (5)$$

where the R-dimensional vector $\tilde{v}_p^T$ acts as an additional column of the matrix $V^T$ as illustrated in FIG. 3D. This in turn leads to the definition of the vector $$\bar{\tilde{v}}_p = \tilde{v}_p S = \tilde{w}_p^T U \qquad (6)$$

for any out-of-vocabulary word $\tilde{w}_p$ in the orthographic vector space (block 223). As previously described in conjunction with FIG. 2A, the weighing at block 221 may use a different algorithm or omitted altogether.

Referring now to FIG. 2D, one embodiment of a neighborhood method 230 that creates the orthographic neighborhood, and the corresponding pronunciation neighborhood, for the out-of-vocabulary word is described. The relative positions of the orthographic anchors in the orthographic vector space reflect a parsimonious encoding of the orthography used in the training data as described above in conjunction with FIG. 2A. Thus, any out-of-vocabulary word represented by a vector "close" (in some suitable metric) to a particular orthographic anchor in the orthographic vector space can be expected to be related to the corresponding in-vocabulary word, and conversely any in-vocabulary word whose orthographic anchor is "close" to the particular vector representing the out-of-vocabulary word in the space will tend to be associated with the corresponding out-of-vocabulary word.

Accordingly, at block 231, the method 230 determines a measure of closeness for each orthographic anchor with respect to the representation of the out-of-vocabulary word. In one embodiment, the closeness measure is calculated as the cosine of the angle between the representation of the out-of-vocabulary word $\tilde{v}_p$ and each orthographic anchor $\bar{v}_j$ $$K = (\tilde{v}_p, \bar{v}_j) = \cos(\tilde{v}_p S, v_j S) = \frac{\tilde{v}_p S^2 v_j^t}{\|\tilde{v}_p S\| \, \|v_j S\|} \tag{7}$$

for any $1 \le j \le M$. However, the invention is not so limited and any closeness measure, such as Euclidean and Gaussian (also known as Malahanobis), based on "bona fide" distances defined on a vector space may be used. A "bona fide" distance is one that conforms to a set of three mathematical properties as is well-known in the art.

The orthographic anchors are ranked in decreasing order of their closeness at block 233. The closeness measure of each orthographic anchor (block 235) is evaluated against pre-determined closeness threshold (block 237). The in-vocabulary word corresponding to each orthographic anchor that meets the closeness threshold is added to the orthographic neighborhood (block 239). Once the appropriately close orthographic anchors have been evaluated (block 241), the associated pronunciation neighborhood for the given out-of-vocabulary word is created from the corresponding phoneme strings for the words in the orthographic neighborhood using the dictionary (block 243). One of skill in the art will immediately recognize that a word in the vocabulary may have more than one pronunciation and thus may be represented in the pronunciations neighborhood by multiple phoneme strings. Furthermore, it will be that appreciated because the orthographic anchors are ranked at block 233, the loop represented by blocks 235 until 241 may be terminated as soon as one of the anchors fails to meet the closeness threshold. Additionally, one of skill in the art will immediately understand that the orthographic neighborhood may be more or less populated depending on the filtering criteria applied to the orthographic anchors and on the number of orthographic anchors in the orthographic space.

Turning now to FIG. 2E, one embodiment of an alignment method 250 that arranges phoneme sub-strings from the pronunciation neighborhood to produce a pronunciation for the out-of-vocabulary word is described. By construction, each phoneme string in the pronunciation neighborhood contains at least one sub-string that is germane to the out-of-vocabulary word considered. The method 250 exploits contexts within the word to select the appropriate phoneme strings in the pronunciation neighborhood and to align those phoneme strings to find the germane sub-strings. As an aid to understanding the following description, assume the contexts are letter-based, e.g., a particular letter and the immediately preceding and succeeding letter or marker, but the invention is not so limited.

The method 250 starts at the beginning of the out-of-vocabulary word and moves left-to-right through the contexts (block 251), selecting for each context, a set of candidate phoneme strings in the pronunciation neighborhood that are close, in some measure, to the context (block 253). In one embodiment, the context is the same length n as the letter strings mapped into the orthographic vector space and the candidate phoneme strings are selected using the closeness measure described above in conjunction with FIG. 2D. Alternate embodiments that use other closeness measurements for strings, such as Hamming and Levenshtein (also know as "edit") distances, are also contemplated as within the scope of the invention. The first set of candidate phoneme strings correspond to orthographic anchors containing a beginning-of-word marker and the last set of candidate phoneme strings correspond to orthographic anchors containing an end-of-word marker (as described above in conjunction with FIG. 2A). It will be appreciated that the appropriate phoneme strings in the pronunciation neighborhood may be tagged with beginning and end word markers.

Once the set of candidate phoneme strings have been selected for each context (block 255), the method 250 evaluates each set of candidate phoneme strings (block 257) by aligning them on common sub-strings (block 259) and determining the most common sub-string for each set (block 261). The most common sub-string for each set will be used as the pronunciation for that context of the out-of-vocabulary word. Additionally, the most common sub-strings for adjacent contexts are merged when there is overlap between them at block 265, using an algorithm such as "dynamic time warping" as is well-known in the art. It will be appreciated that the merge processing represented by block 265 may be omitted. Furthermore, although the merge processing is illustrated as occurring after all the sets have been evaluated (block 263), one of skill in the art will immediately recognize that it may be performed as part of the set evaluation loop.

In one embodiment of the processing at block 263, the method 250 uses a variation of a sequence analysis technique originally applied in the field of bio-informatics to align specific regions of two protein sequences, with provisions for dealing with gaps in the alignment. Assume, without loss of generality, the need to align two phoneme strings $\phi_1 \ldots \phi_k \ldots \phi_K$ and $\psi_1 \ldots \psi_l \ldots \psi_L$ (of length K and L, respectively) from the pronunciation neighborhood, and de-note by A(k, l) the minimum cost alignment between $\phi_1 \ldots \phi_k \ldots \phi_K$ and $\psi_1 \ldots \psi_l \ldots \psi_L$. If C(k, 1) is the cost of substituting phoneme $\psi_l$ for phoneme $\phi_k$, g(i, k) the cost of a gap $\phi_i \ldots \phi_k$ in the first string, and h(j, l) the cost of a gap $\psi_j \ldots \psi_l$ in the second string, a recursive alignment equation can be written as $$A(k,l) = \min\{A(k-1, l-1) + C(k,l), G(i,k), H(j,l)\} \tag{8}$$

where $$G(i, k) = \min_{0 \le i \le k-1} \{A(i, l) + g(i, k)\} \tag{9}$$

$$H(j, l) = \min_{0 \le j \le l-1} \{A(k, j) + h(j, l)\} \tag{10}$$

with initial conditions $A(k, 0) = h(0, k)$, $1 \le k \le K$ and $A(0, l) = g(0, l)$, $1 \le l \le L$.

In an alternate embodiment, the processing at blocks 251 until 255 is repeated using different granularities of contexts within the out-of-vocabulary word. The candidate phoneme strings for the contexts at a particular level of granularity form a "mini-pronunciation neighborhood" for that level, which may be arranged in a hierarchy. The phoneme strings for each context in each mini-neighborhood are aligned to find the common sub-strings (blocks 257 until 263). The resulting pronunciation could contain sub-strings from different mini-pronunciation neighborhoods.

It will be appreciated that the alignment method 250 may proceed in a pattern other than left-to-right through the input word, e.g., from both ends to the middle or from the middle outward, using the beginning-of-word and end-of word markers, and such embodiments are contemplated as within the scope of the invention.

In practice, the methods described above may constitute one or more programs made up of machine-executable instructions. Describing the methods with reference to the flowcharts in FIGS. 2A–D enables one skilled in the art to develop such programs, including such instructions to carry out the operations (acts) represented by the logical blocks on suitably configured machines (the processor of the machine executing the instructions from machine-readable media). The machine-executable instructions may be written in a computer programming language or may be embodied in firmware logic or in hardware circuitry. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a machine causes the processor of the machine to perform an action or produce a result. It will be further appreciated that more or fewer processes may be incorporated into the methods illustrated in FIGS. 2A–D without departing from the scope of the invention and that no particular order is implied by the arrangement of blocks shown and described herein.

Figure 4A:
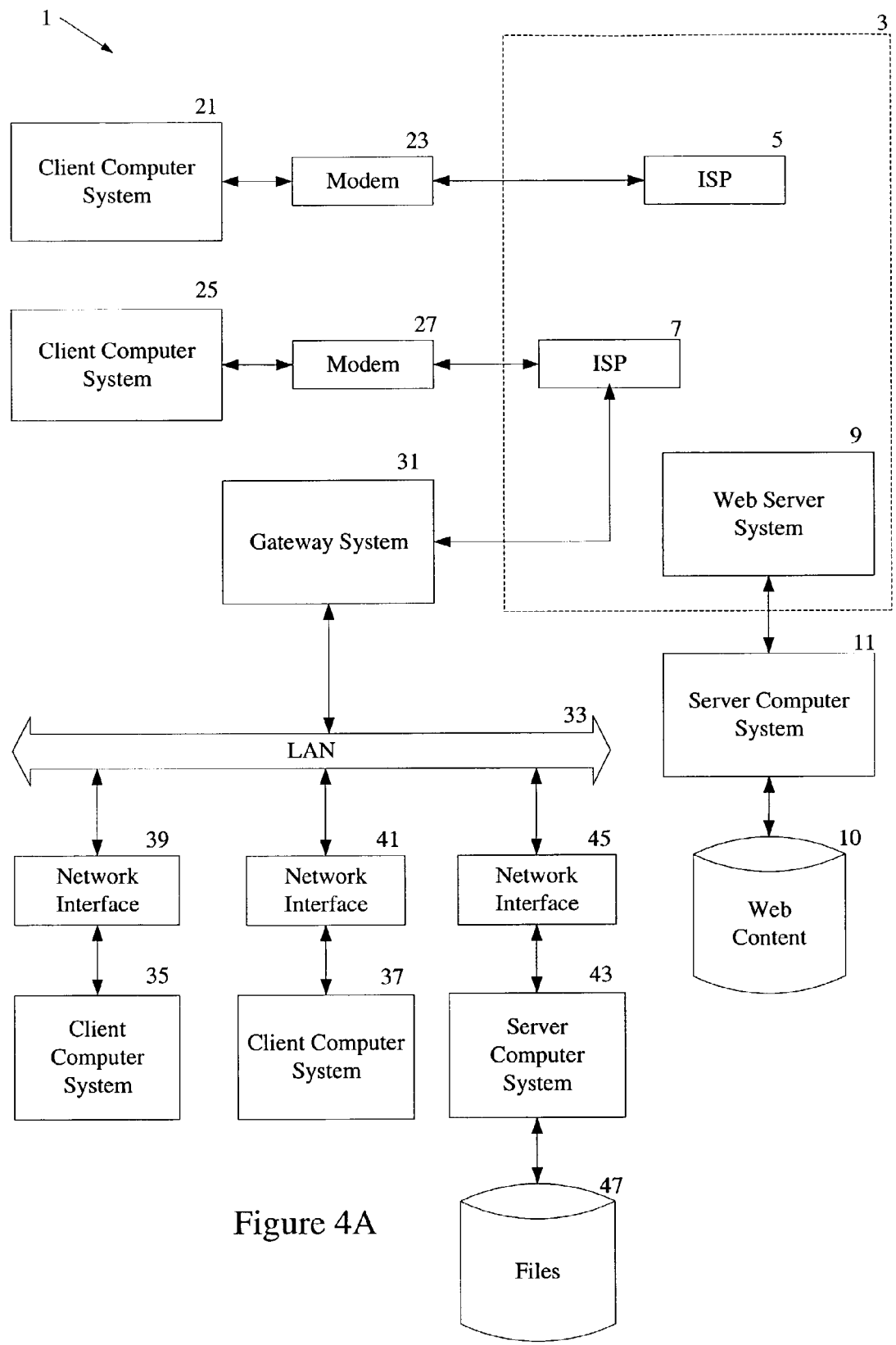
FIG. 4A is a diagram of one embodiment of an operating environment suitable for practicing the present invention.
Figure 4B:
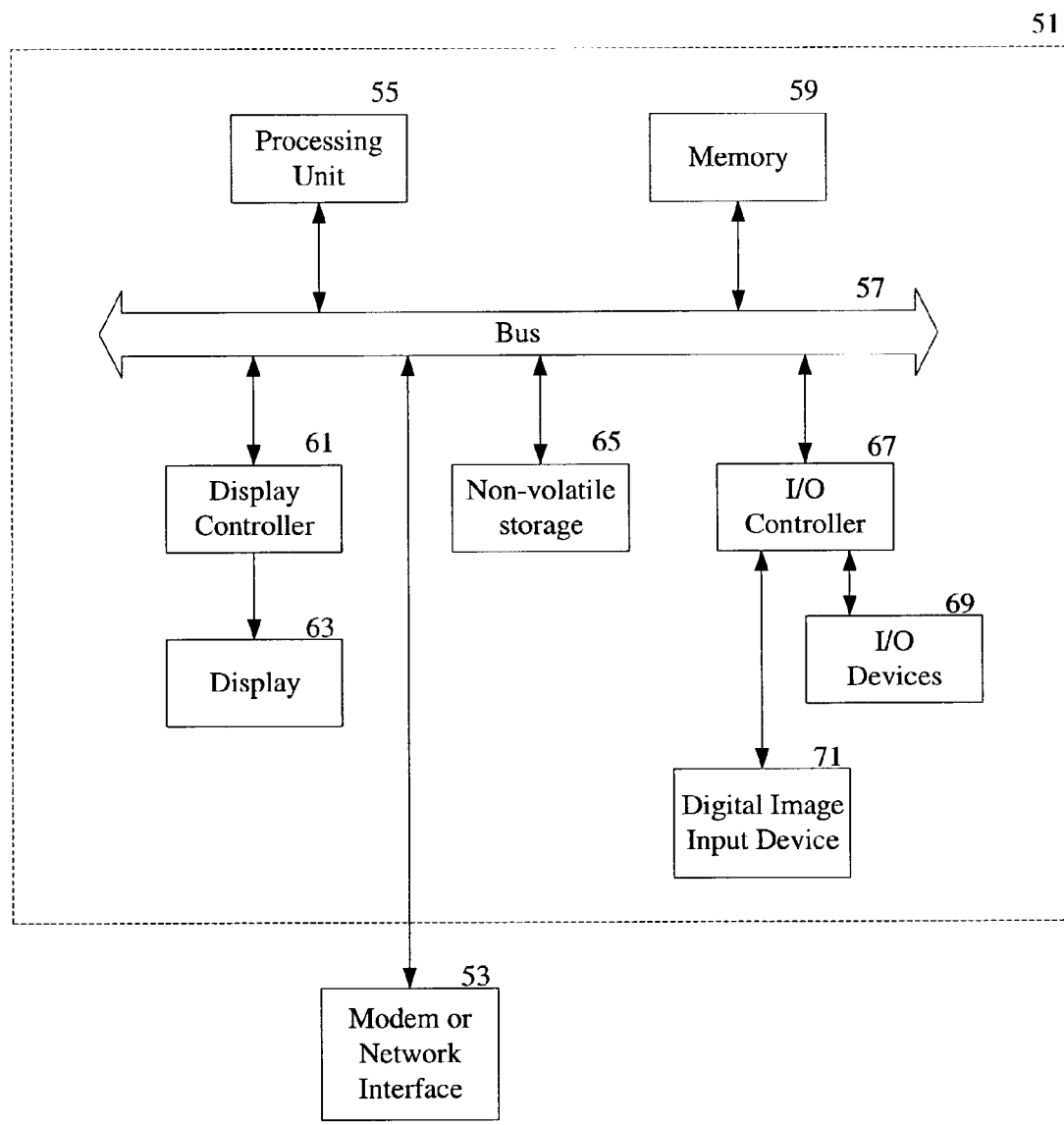
FIG. 4B is a diagram of one embodiment of a computer system suitable for use in the operating environment of FIG. 4A.

In particular, the methods of FIGS. 2A–D may be modules that are executed from a memory within a computer system such as illustrated in FIG. 4B. The logical representation of the matrices illustrated in FIGS. 3A–D, and the feature vectors used as the orthographic anchors and the representation of the out-of-vocabulary word by the methods may also be resident in the memory. It will be appreciated that the orthographic anchors in the orthographic vector space created during the training process may be more permanently stored on a mass storage device and retrieved into memory when required to evaluate an out-of-vocabulary word.

The following description of FIGS. 4A–B is intended to provide an overview of computer hardware and other operating components suitable for performing the methods of the invention described above, but is not intended to limit the applicable environments. One of skill in the art will immediately appreciate that the invention can be practiced with other computer system configurations, including hand-held devices, multiprocessor systems, microprocessor-based or programmable consumer electronics/appliances, network PCs, minicomputers, mainframe computers, and the like. The invention can also be practiced in distributed computing environments where tasks are performed by remote processing devices that are linked through a communications network.

FIG. 4A shows several computer systems 1 that are coupled together through a network 3, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet 3 is typically provided by Internet service providers (ISP), such as the ISPs 5 and 7. Users on client systems, such as client computer systems 21, 25, 35, and 37 obtain access to the Internet through the Internet service providers, such as ISPs 5 and 7. Access to the Internet allows users of the client computer systems to exchange information, receive and send e-mails, and view documents, such as documents which have been prepared in the HTML format. These documents are often provided by web servers, such as web server 9 which is considered to be "on" the Internet. Often these web servers are provided by the ISPs, such as ISP 5, although a computer system can be set up and connected to the Internet without that system being also an ISP as is well known in the art.

The web server 9 is typically at least one computer system which operates as a server computer system and is configured to operate with the protocols of the World Wide Web and is coupled to the Internet. Optionally, the web server 9 can be part of an ISP which provides access to the Internet for client systems. The web server 9 is shown coupled to the server computer system 11 which itself is coupled to web content 10, which can be considered a form of a media database. It will be appreciated that while two computer systems 9 and 11 are shown in FIG. 4A, the web server system 9 and the server computer system 11 can be one computer system having different software components providing the web server functionality and the server functionality provided by the server computer system 11 which will be described further below.

Client computer systems 21, 25, 35, and 37 can each, with the appropriate web browsing software, view HTML pages provided by the web server 9. The ISP 5 provides Internet connectivity to the client computer system 21 through the modem interface 23 which can be considered part of the client computer system 21. The client computer system can be a personal computer system, consumer electronics/appliance, a network computer, a Web TV system, a handheld device, or other such computer system. Similarly, the ISP 7 provides Internet connectivity for client systems 25, 35, and 37, although as shown in FIG. 4A, the connections are not the same for these three computer systems. Client computer system 25 is coupled through a modem interface 27 while client computer systems 35 and 37 are part of a LAN. While FIG. 4A shows the interfaces 23 and 27 as generically as a "modem," it will be appreciated that each of these interfaces can be an analog modem, ISDN modem, cable modem, satellite transmission interface, or other interfaces for coupling a computer system to other computer systems. Client computer systems 35 and 37 are coupled to a LAN 33 through network interfaces 39 and 41, which can be Ethernet network or other network interfaces. The LAN 33 is also coupled to a gateway computer system 31 which can provide firewall and other Internet related services for the local area network. This gateway computer system 31 is coupled to the ISP 7 to provide Internet connectivity to the client computer systems 35 and 37. The gateway computer system 31 can be a conventional server computer system. Also, the web server system 9 can be a conventional server computer system.

Alternatively, as well-known, a server computer system 43 can be directly coupled to the LAN 33 through a network interface 45 to provide files 47 and other services to the clients 35, 37, without the need to connect to the Internet through the gateway system 31.

FIG. 4B shows one example of a conventional computer system that can be used as a client computer system or a server computer system or as a web server system. It will also be appreciated that such a computer system can be used to perform many of the functions of an Internet service provider, such as ISP 5. The computer system 51 interfaces to external systems through the modem or network interface 53. It will be appreciated that the modem or network interface 53 can be considered to be part of the computer system 51. This interface 53 can be an analog modem, ISDN modem, cable modem, token ring interface, satellite transmission interface, or other interfaces for coupling a computer system to other computer systems. The computer system 51 includes a processing unit 55, which can be a conventional microprocessor such as an Intel Pentium microprocessor or Motorola Power PC microprocessor. Memory 59 is coupled to the processor 55 by a bus 57. Memory 59 can be dynamic random access memory (DRAM) and can also include static RAM (SRAM). The bus 57 couples the processor 55 to the memory 59 and also to non-volatile storage 65 and to display controller 61 and to the input/output (I/O) controller 67. The display controller 61 controls in the conventional manner a display on a display device 63 which can be a cathode ray tube (CRT) or liquid crystal display (LCD). The input/output devices 69 can include a keyboard, disk drives, printers, a scanner, and other input and output devices, including a mouse or other pointing device. The display controller 61 and the I/O controller 67 can be implemented with conventional well known technology. A digital image input device 71 can be a digital camera which is coupled to an I/O controller 67 in order to allow images from the digital camera to be input into the computer system 51. The non-volatile storage 65 is often a magnetic hard disk, an optical disk, or another form of storage for large amounts of data. Some of this data is often written, by a direct memory access process, into memory 59 during execution of software in the computer system 51. One of skill in the art will immediately recognize that the terms "computer-readable medium" and "machine-readable medium" include any type of storage device that is accessible by the processor 55 and also encompass a carrier wave that encodes a data signal.

It will be appreciated that the computer system 51 is one example of many possible computer systems which have different architectures. For example, personal computers based on an Intel microprocessor often have multiple buses, one of which can be an input/output (I/O) bus for the peripherals and one that directly connects the processor 55 and the memory 59 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 59 for execution by the processor 55. A Web TV system, which is known in the art, is also considered to be a computer system according to the present invention, but it may lack some of the features shown in FIG. 4B, such as certain input or output devices. A typical computer system will usually include at least a processor, memory, and a bus coupling the memory to the processor.

It will also be appreciated that the computer system 51 is controlled by operating system software which includes a file management system, such as a disk operating system, which is part of the operating system software. One example of an operating system software with its associated file management system software is the family of operating systems known as Mac® OS from Apple Computer, Inc. of Cupertino, Calif., and their associated file management systems. The file management system is typically stored in the non-volatile storage 65 and causes the processor 55 to execute the various acts required by the operating system to input and output data and to store data in memory, including storing files on the non-volatile storage 65.

Data-driven pronunciation modeling that utilizes orthographic neighborhoods to generate a pronunciation for an out-of-vocabulary word without human supervision has been described. In one embodiment, a training dictionary of $M=56,514$ names, predominantly of Western European origin, yielded $N=8,257$ of unique 3-letter strings. Orthographic anchors were obtained using $R=100$ for the order of the decomposition for the $(8257 \times 56,514)$ matrix W. The closeness threshold was chosen so that on the average each neighborhood comprised approximately 200 entries. These entries were then aligned using equation (8) with the following parameters: (i) exact phoneme matches were encouraged with a zero substitution cost, (ii) vowel-consonant substitutions were prohibited with an infinite substitution cost, and (iii) substituting a vowel (respectively a consonant) for any other vowel (respectively any other consonant) was given the same penalty as introducing a gap. The third criteria incorporates a highly simplistic view of phonology, especially regarding vowels. The pronunciation returned for the name "Krishnamoorthy" was $$k \; r \; IH \; S \; n \; AX \; m \; 1UW \; r \; T \; IY \qquad (11)$$

A comparison with (1) and (2) shows that, while still not entirely correct, this expansion improves upon the pronunciation produced by the prior art decision tree.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. For example, once an appropriate pronunciation for an out-of-vocabulary word is produced, the word may be made permanently part of the dictionary by updating the orthographic space to include an orthographic anchor for the word.

Additionally, it will be appreciated that the processing described herein may be executed by a single system or in a client-server environment, such as illustrated in FIG. 3A. For example, the client system may be responsible for sending the out-of-vocabulary word to the server for modeling, with the server returning one or more pronunciations to the client for output to a user. This configuration could be used with a handheld device that has limited processing capabilities acting as the client and wirelessly transmitting the input word to a server for processing. Alternatively, the server may create and store the orthographic vector space for subsequent downloading to the client, which produces a pronunciation for an out-of-vocabulary word input by a user on the client. Still other configurations include having the client create one or more of the orthographic/pronunciation neighborhoods using a dictionary shared with the server and having the server perform the alignment processing, or vice versa. One of skill in the art will immediately conceive of other client-server configurations that share the processing load and will also understand that the processing load may be shared among a cluster of machines.

Furthermore, although described in terms of speech synthesis, the pronunciation modeling of the present invention also may be employed in speech recognition and speech analysis. Speech recognition typically deals with out-of-vocabulary words by prompting the speaker for the spelling of an unrecognized word. Using the present invention, the letter sequence input can be associated with a phonetic expansion representing the pronunciation for further recognition. Accurate analysis of speech relies on waveforms produced from pronunciations of words, which may be produced by the present invention.

Moreover, one of skill in the art will immediately recognize that the orthographic space defined by mapping words and letter patterns may be used for any type of human-language analysis that relies on the orthography of words, and is not limited to use with speech processing. For example, because words with orthographic anchors close together in an orthographic space share a common characteristic, such as word family ("stem") or declination class, orthographic spaces can be used to determine the characteristics of out-of-vocabulary words.

Therefore, it is manifestly intended that the present invention be limited only by the following claims and equivalents thereof.

What is claimed is:

1. A computerized method comprising:
   mapping words in a dictionary and a set of letter patterns that are characteristic of the words into an orthographic space to create orthographic anchors, each orthographic anchor corresponding to a word in the dictionary, wherein the mapping comprises:
   creating a matrix of feature vectors from the letter patterns and the words;
   decomposing the matrix into row vectors and column vectors; and
   selecting vectors from one of the row vectors and column vectors as the orthographic anchors.

2. The computerized method of claim 1, wherein selecting vectors comprises:
   scaling the vectors by a singular values of a diagonal matrix used in the decomposition.

3. The computerized method of claim 1, wherein decomposing the matrix (W) comprises performing a singular value decomposition $$W = USV^T$$

where N is the number of letter patterns, M is the number of words in the dictionary, U is a N×R left singular matrix containing the row vectors $u_i$ with $1 \leq i \leq N$, S is a R×R diagonal matrix of singular values $s_1 \geq s_2 \geq \ldots \geq s_R > 0$, $V^{[[T]]}$ is a M×R right singular matrix containing the column vectors $v_j$ with $1 \leq j \leq M$, R<<M, N is the order of the decomposition, and $^T$ denotes matrix transposition.

4. The computerized method of claim 1 further comprising:
   weighting each entry $w_{ij}$ in the matrix (W) to reflect the extent to which each letter pattern $t_i$ appeared in each word $w_j$ using $$w_{ij} = (1 - \varepsilon_i) \frac{c_{i,j}}{n_j}$$

where $c_{i,j}$ is the number of times $t_i$ occurs in word $w_j$, $n_j$ is the total number of letter patterns present in this word, and $\varepsilon_i$ is the normalized entropy of $t_i$ in words of the dictionary.

5. The computerized method of claim 1 further comprising:
   determining which letter patterns are members of the set based on the words in the dictionary.

6. The computerized method of claim 1, wherein the dictionary comprises an association between words and word characteristics.

7. The computerized method of claim 1 further comprising:
   determining a characteristic of an input word based on closeness between the orthographic anchors and a representation of the word in the orthographic space.

8. The computerized method of claim 7, wherein the characteristic is selected from the group consisting of word family, declination class, and pronunciation.

9. The computerized method of claim 7 further comprising:
   creating a representation of the input word in the orthographic space.

10. A machine-readable medium having instructions to cause a machine to perform a method comprising:
    mapping words in a dictionary and a set of letter patterns that are characteristic of the words into an orthographic space to create orthographic anchors, each orthographic anchor corresponding to a word in the dictionary, wherein the mapping comprises:
    creating a matrix of feature vectors from the letter patterns and the words;
    decomposing the matrix into row vectors and column vectors; and
    selecting vectors from one of the row vectors and column vectors as the orthographic anchors.

11. The machine-readable medium of claim 10, wherein selecting vectors comprises:
    scaling the vectors by a singular values of a diagonal matrix used in the decomposition.

12. The machine-readable medium of claim 10, wherein decomposing the matrix (W) comprises performing a singular value decomposition $$W = USV^T$$

where N is the number of letter patterns, M is the number of words in the dictionary, U is a N×R left singular matrix containing the row vectors $u_i$ with $1 \leq i \leq N$, S is a R×R diagonal matrix of singular values $s_1 \geq s_2 \geq \ldots \geq s_R > 0$, $V^{[[T]]}$ is a M×R right singular matrix containing the column vectors $v_j$ with $1 \leq j \leq M$, R<<M, N is the order of the decomposition, and $^T$ denotes matrix transposition.

13. The machine-readable medium of claim 10, wherein the method further comprises:
    weighting each entry $w_{ij}$ in the matrix (W) to reflect the extent to which each letter pattern $t_i$ appeared in each word $w_j$ using $$w_{ij} = (1 - \varepsilon_i)\frac{c_{i,j}}{n_j}$$

where $c_{i,j}$ is the number of times $t_i$ occurs in word $w_j$, $n_j$ is the total number of letter patterns present in this word, and $\varepsilon_i$ is the normalized entropy of $t_i$ in words of the dictionary.

14. The machine-readable medium of claim 10, wherein the method further comprises:
   determining which letter patterns are members of the set based on the words in the dictionary.

15. The machine-readable medium of claim 10, wherein the dictionary comprises an association between words and word characteristics.

16. The machine-readable medium of claim 10, wherein the method further comprises:
   determining a characteristic of an input word based on closeness between the orthographic anchors and a representation of the word in the orthographic space.

17. The machine-readable medium of claim 16, wherein the characteristic is selected from the group consisting of word family, declination class, and pronunciation.

18. The machine-readable medium of claim 16, wherein the method further comprises:
   creating a representation of the input word in the orthographic space.

19. A system comprising:
   a processing unit coupled to a memory through a bus; and
   an orthographic anchor process executed from the memory by the processing unit to cause the processing unit to map words in a dictionary and a set of letter patterns that are characteristic of the words into an orthographic space to create orthographic anchors, each orthographic anchor corresponding to a word in the dictionary, wherein the orthographic anchor process further causes the processing unit, when mapping words, to create a matrix of feature vectors from the letter patterns and the words, decompose the matrix into row vectors and column vectors, and select vectors from one of the row vectors and column vectors as the orthographic anchors.

20. The system of claim 19, wherein the orthographic anchor process further causes the processing unit, when selecting vectors to scale the vectors by a singular values of a diagonal matrix used in the decomposition.

21. The system of claim 19, wherein the orthographic anchor process further causes the processing unit, when decomposing the matrix (W), to perform a singular value decomposition $$W = USV^T$$

where N is the number of letter patterns, M is the number of words in the dictionary, U is a N×R left singular matrix contain the row vectors $u_i$ with $1 \leq i \leq N$, S is a R×R diagonal matrix of singular values $s_1 \geq s_2 \geq \ldots \geq s_R > 0$, $V^{[[T]]}$ is a M×R right singular matrix contain the column vectors $v_j$ with $1 \leq j \leq M$, R<<M, N is the order of the decomposition, and $^T$ denotes matrix transposition.

22. The system of claim 19, wherein the orthographic anchor process further causes the processing unit to weight each entry $w_{ij}$ in the matrix (W) to reflect the extent to which each letter pattern $t_i$ appeared in each word $w_j$ using $$w_{ij} = (1 - \varepsilon_i)\frac{c_{i,j}}{n_j}$$

where $c_{i,j}$ is the number of times $t_i$ occurs in word $w_j$, $n_j$ is the total number of letter patterns present in this word, and $\varepsilon_i$ is the normalized entropy of $t_i$ in words of the dictionary.

23. The system of claim 19, wherein the orthographic anchor process further causes the processing unit to determine which letter patterns are members of the set based on the words in the dictionary.

24. The system of claim 19, wherein the dictionary comprises an association between words and word characteristics.

25. The system of claim 19 further comprising an analysis process executed from the memory by the processing unit to cause the processing unit to determine a characteristic of an input word based on closeness between the orthographic anchors and a representation of the word in the orthographic space.

26. The system of claim 25, wherein the characteristic is selected from the group consisting of word family, declination class, and pronunciation.

27. The system of claim 25, wherein the analysis process further causes the processing unit to create a representation of the input word in the orthographic space.

28. An apparatus comprising:
   means for receiving a dictionary; and
   means for mapping words in the dictionary and a set of letter patterns that are characteristic of the words into an orthographic space to create orthographic anchors, each orthographic anchor corresponding to a word in the dictionary, wherein the means for mapping comprises:
      means for creating a matrix of feature vectors from the letter patterns and the words; and
      means for decomposing the matrix into row vectors and column vectors, vectors from one of the row vectors and the column vectors being selected as the orthographic anchors.

29. The apparatus of claim 28, wherein the means for mapping further comprises:
   means for scaling the vectors by a singular values of a diagonal matrix used in the decomposition.

30. The apparatus of claim 28, wherein the means for decomposing the matrix (W) performs a singular value decomposition $$W = USV^T$$

where N is the number of letter patterns, M is the number of words in the dictionary, U is a N×R left singular matrix containing the row vectors $u_i$ with $1 \leq i \leq N$, S is a R×R diagonal matrix of singular values $s_1 \geq s_2 \geq \ldots \geq s_R > 0$, $V^{[[T]]}$ is a M×R right singular matrix containing the column vectors $v_j$ with $1 \leq j \leq M$, R<<M, N is the order of the decomposition, and $^T$ denotes matrix transposition.

31. The apparatus of claim 28 further comprising:
   means for weighting each entry $w_{ij}$ in the matrix (W) to reflect the extent to which each letter pattern $t_i$ appeared in each word $w_j$ using $$w_{ij} = (1-\varepsilon_i)\frac{c_{i,j}}{n_j}$$

where $c_{i,j}$ is the number of times $t_i$ occurs in word $w_j$, $n_j$ is the total number of letter patterns present in this word, and $\varepsilon_i$ is the normalized entropy of $t_i$ in words of the dictionary.

32. The apparatus of claim 28 further comprising:
means for determining which letter patterns are members of the set based on the words in the dictionary.

33. The apparatus of claim 28 wherein the dictionary comprises an association between words and word characteristics.

34. The apparatus of claim 28 further comprising:
means for determining a characteristic of an input word based on closeness between the orthographic anchors and a representation of the word in the orthographic space.

35. The apparatus of claim 34, wherein the characteristic is selected from the group consisting of word family, declination class, and pronunciation.

36. The apparatus of claim 34 further comprising:
means for creating a representation of the input word in the orthographic space.

* * * * *